United States Patent
McNair et al.

(10) Patent No.: US 9,939,260 B2
(45) Date of Patent: Apr. 10, 2018

(54) SATELLITE TRANSFER ORBIT SEARCH METHODS

(71) Applicant: The Boeing Company, Chicago, IL (US)

(72) Inventors: Stephanie Lauren McNair, Colorado Springs, CO (US); John Roman Bystroff, Colorado Springs, CO (US); Caleb Luke Pool, Lake George, CO (US)

(73) Assignee: The Boeing Company, Chicago, IL (US)

( * ) Notice: Subject to any disclaimer, the term of this patent is extended or adjusted under 35 U.S.C. 154(b) by 891 days.

(21) Appl. No.: 14/472,099

(22) Filed: Aug. 28, 2014

(65) Prior Publication Data

US 2016/0061598 A1   Mar. 3, 2016

(51) Int. Cl.
| | |
|---|---|
| *B64G 1/36* | (2006.01) |
| *G05D 1/00* | (2006.01) |
| *G05D 3/00* | (2006.01) |
| *G06F 7/00* | (2006.01) |
| *G06F 17/00* | (2006.01) |
| *G01B 21/00* | (2006.01) |
| *B64G 1/00* | (2006.01) |
| *B64G 3/00* | (2006.01) |
| *G01C 21/24* | (2006.01) |
| *G01S 17/66* | (2006.01) |

(52) U.S. Cl.
CPC ............. *G01B 21/00* (2013.01); *B64G 1/007* (2013.01); *B64G 3/00* (2013.01); *G01S 17/66* (2013.01); *G05D 1/00* (2013.01)

(58) Field of Classification Search
CPC .......... G01B 21/00; B64G 1/007; B64G 3/00; G01S 17/66; G05D 1/00
USPC ..................................................... 701/13, 531
See application file for complete search history.

(56) References Cited

U.S. PATENT DOCUMENTS

| | | | |
|---|---|---|---|
| 2002/0052676 A1* | 5/2002 | Suzuki | H01Q 1/125 701/13 |
| 2011/0196550 A1 | 8/2011 | Carrico, Jr. et al. | |
| 2012/0072112 A1* | 3/2012 | Bagnall | G01S 19/20 701/531 |
| 2014/0070987 A1* | 3/2014 | Jarvis | G01S 19/22 342/357.21 |

OTHER PUBLICATIONS

European Patent Office, "European Search Report", issued in connection with EP Patent Application No. 15182955.3, dated Jan. 12, 2016, 8 pages.

(Continued)

*Primary Examiner* — Mahmoud S Ismail (74) *Attorney, Agent, or Firm* — Hanley, Flight and Zimmerman, LLC (57) ABSTRACT

Satellite transfer orbit search methods are described herein. One disclosed example method includes determining, based on boundary transfer orbits of a satellite, end points of an oblate epicycloid segment related to a transfer orbit of the satellite, and calculating, using a processor, a shape of the oblate epicycloid segment based on satellite data and the end points to define a search zone to determine a position of the satellite as the satellite moves along the transfer orbit.

17 Claims, 6 Drawing Sheets

(56) References Cited

OTHER PUBLICATIONS

Subramanian et al., "Precise Orbit Determination During Transfer Orbit Phase of GSAT-1", Journal of Spacecraft and Rockets, American Institute of Aeronautics and Astronautics, vol. 41, No. 5, Sep. 1, 2004, 10 pages.
Jiang, et al., "Computing and Visualizing Reachable Volumes for Maneuvering Satellites," Advance Maui Optical and Space Surveillance Technologies Conference, Sep. 2011, 10 pages.

* cited by examiner

SATELLITE TRANSFER ORBIT SEARCH METHODS

FIELD OF THE DISCLOSURE

This patent relates generally to search methods and, more particularly, to satellite transfer orbit search methods.

BACKGROUND

Some known satellite tracking systems employ space surveillance sensors such as the space surveillance network (SSN) to gain or re-gain positional information of a satellite or a resident space object (RSO) that has maneuvered from an initial orbit to a final orbit along a transfer orbit (e.g., a transfer maneuver). Uncertainty in the time and location of an initial transfer maneuver typically causes uncertainty as to the position or location of the satellite during the transfer orbit. Typically, after the transfer maneuver initiates, custody (e.g., positional awareness) of the satellite is lost and later regained after the satellite has performed a final maneuver to enter the final orbit. The space surveillance sensors seeking the satellite typically conduct searches that are not coordinated and rely on limited observations and/or historical profiles that provide a rough estimate of orbit parameters. Current search approaches often lead to inefficient use of sensor resources as sensors cover regions that do not represent the satellite's position, fail to cover locations where the satellite is located, and/or do not coordinate search attempts between sensors leading to overlapping coverage. The resulting uncertainty causes significant delays in regaining custody of the satellite and a wait time of hours or days before the position of the satellite is known.

Additionally, it is difficult to determine a position of a satellite owned or operated by non-cooperating entities, or a satellite for which communication has been lost. Typically, several hours may be required to track the positions of these satellites based on known search methods. In some scenarios, the positional data for a satellite is determined after the satellite has reached the final orbit.

SUMMARY

An example method includes determining, based on boundary transfer orbits of a satellite, end points of an oblate epicycloid segment related to a transfer orbit of the satellite, and calculating, using a processor, a shape of the oblate epicycloid segment based on satellite data and the end points to define a search zone to determine a position of the satellite as the satellite moves along the transfer orbit.

Another example method includes determining a range of boundary transfer orbits of a satellite, and determining end points of one or more oblate epicycloid segments related to a transfer orbit of the satellite at a specified time based on the range of boundary transfer orbits, and calculating, using a processor, the one or more epicycloid segments based on the end points, where the one or more oblate epicycloid segments are to define an isotemporal line, surface or volume to define a search zone for the satellite at the specified time.

An example tangible machine readable medium has instructions stored thereon, which when executed, cause a machine to determine end points of an oblate epicycloid segment related to a transfer orbit of a satellite, and calculate the segment of the oblate epicycloid based on satellite data and the end points, where the segment is to be used in searching for a position of the satellite as it moves along the transfer orbit.

BRIEF DESCRIPTION OF THE DRAWINGS

Wherever possible, the same reference numbers will be used throughout the drawing(s) and accompanying written description to refer to the same or like parts.

DETAILED DESCRIPTION

Transfer orbit search pattern algorithms are disclosed herein. Typically, a satellite or resident space object (RSO) orbiting the Earth may be positioned in a parking or initial orbit (e.g., a first orbit) before performing an initial maneuver to initiate a transfer orbit (geosynchronous transfer orbit, etc.) to reach a final orbit. The satellite may then perform a final maneuver to maintain the final orbit. For example, the satellite may start from a low earth orbit (LEO) and maneuver through a geosynchronous transfer orbit (GTO) to reach a final geosynchronous orbit (GEO). When the time and location of the initial maneuver, which usually occurs via satellite thrusters, is unknown, custody of the satellite (i.e., positional awareness of the satellite) may be lost, thereby requiring a system of sensors (e.g., detection sensors, detection and tracking sensors, etc.) to either actively search for the satellite, or apply filters to sensor data in order to re-gain custody. Often, custody is not re-gained until after the satellite achieves its final orbit.

The examples disclosed herein provide an efficient manner of guiding (e.g., steering) and/or directing (e.g., instructing) one or more sensors to determine or seek a position of the satellite by defining search parameters used to constrain (e.g., narrow) a search field (e.g., a search zone, a search line, a search area, a search volume, a search region etc.) pertaining to a position (e.g., a position as a function of time) of the satellite as it moves from an initial orbit to a final orbit, thereby reducing tracking times of the satellite. The search field may be used by the sensor(s) to narrow and/or focus an area or region to search for the satellite and/or the sensor(s) may be focused or directed toward a narrowed search field, for example. The examples disclosed herein enable relatively quick determination of a position of a satellite moving through a transfer orbit in which contact with the satellite has been lost and/or operated by an uncooperative entity, for example. The sensor(s) used to search for the satellite may be object detection and tracking systems used to track a satellite, and may be a steerable type, a staring type or a combination of both. Additionally or alternatively, the sensor(s) may have a selectable field (e.g., wide, narrow, etc.). The examples disclosed herein also allow computational savings and/or reduced use of resources (e.g., sensor systems and their supporting hardware, infrastructure, etc.) by narrowing the search field and/or providing parameters to filter through sensor data for satellite location data.

The examples disclosed herein calculate a segment (e.g., a portion, a chord, a line segment, a surface segment, a volume segment, etc.) of an oblate epicycloid pertaining to a satellite in the process of transitioning to a transfer orbit or in the process of moving through a transfer orbit. The oblate epicycloid is a mathematical function that may be represented by a curved line, a surface (e.g., a contoured or curved surface) or a volume. The examples disclosed herein determine end points of an oblate epicycloid and then generate or determine (e.g., calculate) the segment based on the end points and limited information about the transfer orbit. In some examples, multiple oblate epicycloid segments may be calculated to handle additional variables in the satellite's transfer orbit. The calculated segment(s) are then used to generate or create a search pattern and/or determine a position (e.g., a position as a function of time) of the satellite based on a range of trajectory paths of the satellite. The segment(s) may define a line, volume or a surface to constrain or narrow a search field (e.g., a search zone, a search fence, etc.), thereby allowing relatively quick acquisition of the satellite position. The search field may be a surface or volume defined by two or more oblate epicycloid segments, for example. The the end points of the oblate epicycloid segment(s) are based on boundary transfer orbits in conjunction with the oblate epicycloid.

In some examples, a probability distribution function (i.e., a probability density function) of a position of the satellite is calculated or generated in relation to the segment. In some examples, sensors (e.g., detection and tracking systems used to track the satellite) are directed to search for the satellite based on the segment and/or the probability distribution function. In some examples, a search parameter is determined or generated to seek the position of the satellite. In some examples, the search parameter is communicated and/or transmitted to a sensor. In some examples the oblate epicycloid segment is used as a filter of sensor data (e.g., aggregate sensor data) to narrow and/or search through the sensor data for positional data of the satellite.

As used herein, the term "satellite" may refer to an RSO and vice-versa. As used herein, the term "satellite" refers to an object orbiting a planet or other object in space. As used herein, an oblate epicycloid (e.g., a closed oblate epicycloid) describes a function that may be represented by a curve. As used herein, the term "sensor" refers to a satellite detection and tracking system, or a satellite detection system. As used herein, satellite data may include but is not limited to, a satellite velocity, a satellite position, a last known orbit, an expected size and shape of a final (e.g., target) orbit such as a semi-major axis, Right Ascension of Ascending Node (RAAN), an argument of perigee, an eccentricity, a mean motion and/or inclination, a range of possible maneuver times based on last successful collect and/or a first missed collect, an expected maneuver time with uncertainty, a probability distribution function (PDF) of likely maneuver times (e.g., most likely maneuver times), a covariance matrix of the satellite positions, and/or a parking orbit two line element set (TLE), etc. As used herein, the term "sensor data" refers to information gained from a sensor used to gain positional knowledge of a satellite including, but not limited to, time and range, range-rate, azimuth angle, and/or elevation angle, etc.

Figure 1:
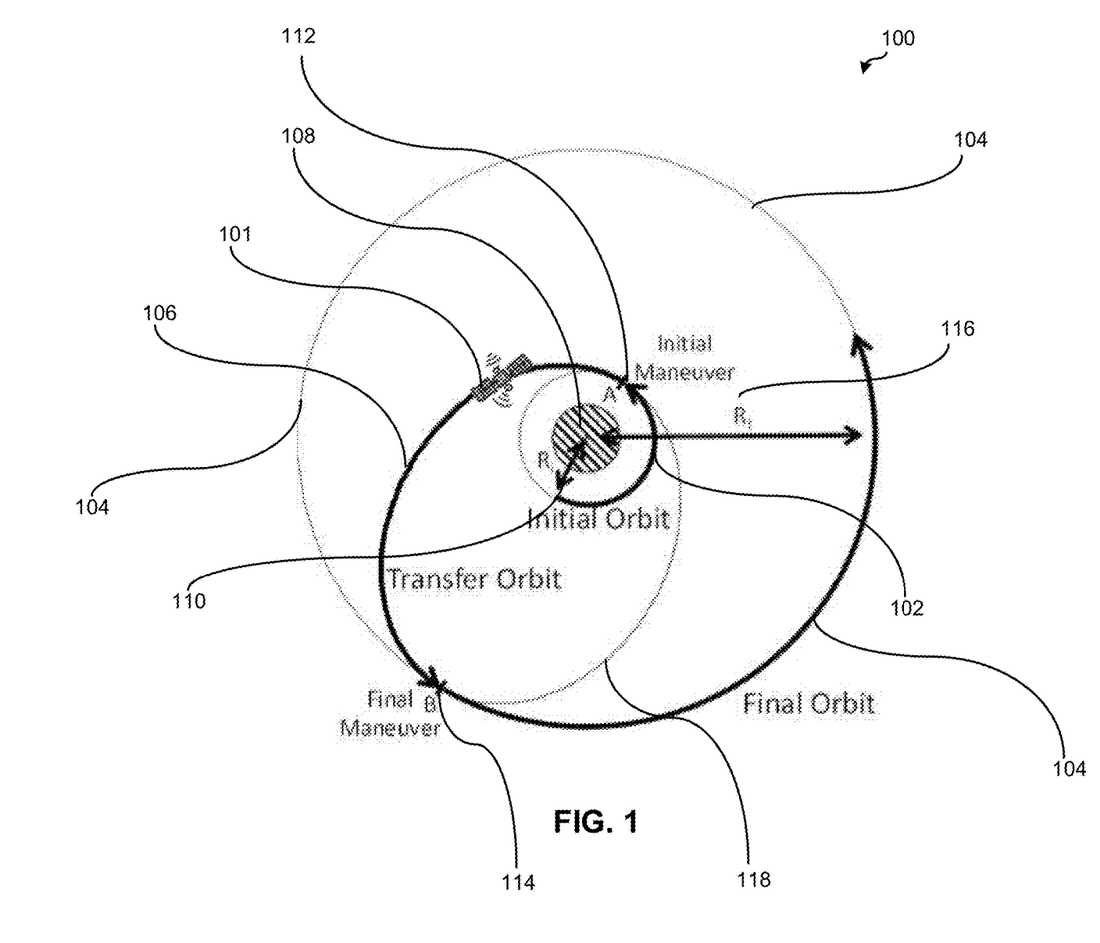
FIG. 1 is an example orbital pathway diagram of an example satellite moving from an initial orbit to a final orbit via a known transfer orbit.

FIG. 1 is an example orbital pathway diagram 100 of a satellite or RSO 101 moving from an initial orbit 102 to a final orbit 104 via a transfer orbit 106. In this example, the satellite 101 orbits a planet 108 in the initial orbit 102 with a corresponding orbital radius 110 depicted by "$R_i$." In this example, the satellite 101 begins its travel along the transfer orbit 106 at a known point 112 by performing an initial maneuver using thrusters. As the satellite 101 moves from the initial orbit 102 to the final orbit 104, the satellite 101 moves along a path defined by the transfer orbit 106. When the satellite 101 has reached the final orbit 104 at a second point 114, which is denoted by "B," the satellite 101 uses thrusters to perform a final maneuver to remain in the final orbit 104, which has a corresponding orbital radius 116 denoted by "$R_f$." While the example shown in the orbital pathway diagram 100 depicts the satellite 101 moving from the lower initial orbit 102 to the higher final orbit 104, a second portion 118 of the transfer orbit 106 may represent the orbital pathway if the satellite 101 does not complete the final maneuver to move into the higher final orbit 104, thereby causing the satellite 101 to orbit along the transfer orbit 106. Alternatively, the second portion 118 may represent a pathway from a higher orbit to a lower orbit.

Figure 2:
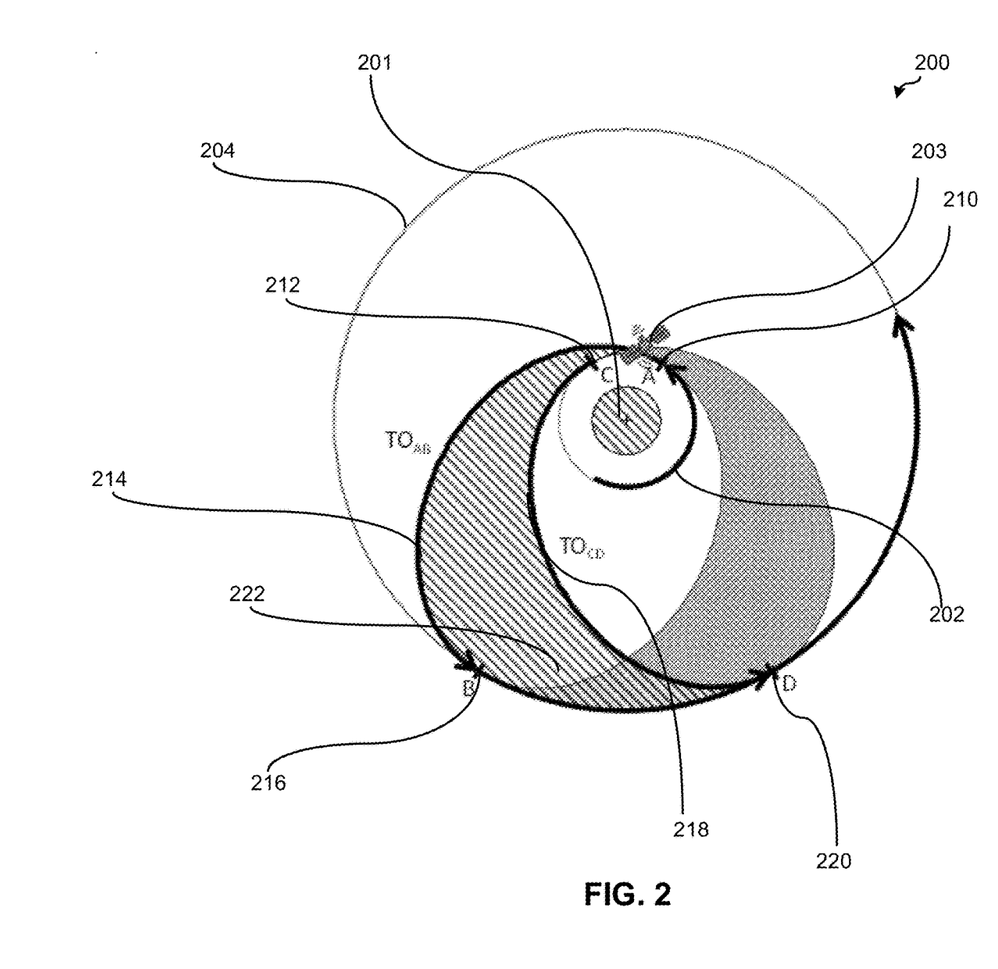
FIG. 2 is an example orbital pathway diagram of another example satellite moving from an initial orbit to a final orbit, when the exact transfer orbit is not known.

FIG. 2 is an example orbital pathway diagram 200 of another example satellite 203. In this example, the satellite 203 orbits a planet 201 and is moving from a lower initial orbit 202 to a final orbit 204. The satellite 203 of the illustrated example transitions from the initial orbit 202 to the final orbit 204 at an unknown time between a first point (e.g., an exit point) 210, which is denoted by "A," and a second point (e.g., an exit point) 212 denoted by "C." The first and second points 210, 212 of the illustrated example correspond to an uncertainty of a position and/or time at which the satellite 203 leaves the initial orbit 202 to enter a transfer orbit to the final orbit 204. The first point 210 defines a first boundary trajectory path (e.g., transfer orbit path, boundary orbit path, boundary trajectory etc.) 214, which is denoted by "$TO_{AB}$", between the first point 210 and a third point 216 denoted by "B." Likewise, the second point 212 defines a second boundary trajectory path (e.g., transfer orbit path, boundary orbit path, boundary trajectory etc.) 218, which is denoted by "$TO_{CD}$," between the second point 212 and a fourth point 220 denoted by "D." The first and second trajectory paths 214, 218 of the illustrated example define a boundary (e.g., enclosure, region, etc.) 222, which may be a surface or a volume.

Figure 3:
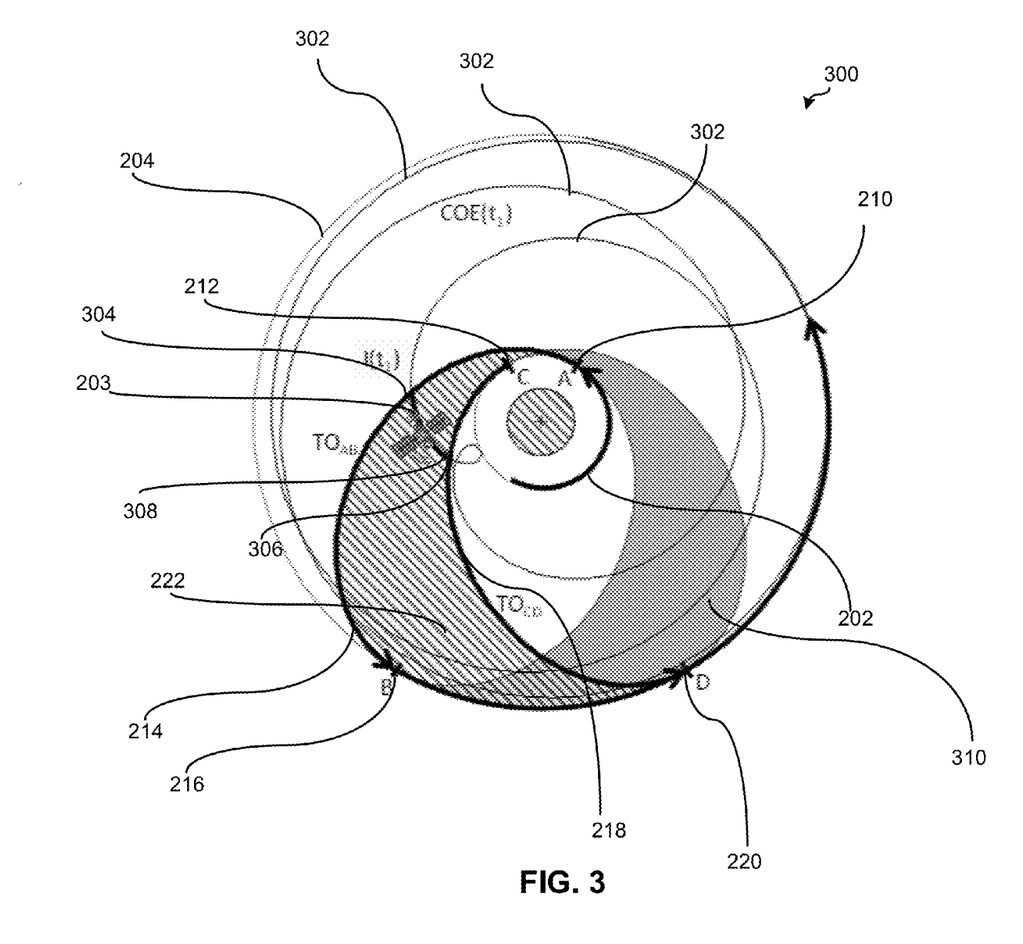
FIG. 3 is another example orbital pathway diagram of the example satellite shown in FIG. 2, at a later time, with an example oblate epicycloid in accordance with the teachings of this disclosure.

FIG. 3 illustrates another example orbital pathway diagram 300 of the example satellite 203 of FIG. 2, at a later point in time, with an example closed oblate epicycloid 302, in accordance with the teachings of this disclosure. The oblate epicycloid 302 of the illustrated example is depicted on the orbital pathway diagram 300 and denoted by $COE(t_1)$. Similar to the example of FIG. 2, the satellite 203 initiated movement towards a transfer orbit between the initial orbit 202 to the final orbit 204 at an unknown time between the first and second points 210, 212. The oblate epicycloid 302 is a mathematical function that defines a geometric shape (e.g. a curve) and may be a function of many parameters including, but not limited to, independent variables, time, as denoted by "t," and the maneuver time into the transfer orbit, as denoted by "τ." The maneuver start time, τ, is a constrained range of values that, in the example of FIG. 2, ranges from the time satellite 203 reaches a first point 210 (A) to the time satellite 203 reaches the second point 212 (C) in the parking orbit 202. The oblate epicycloid 302 of the illustrated example is also a function of additional transfer orbit parameters including the semi-major axis denoted by "a," the semi-minor axis denoted by "b," the eccentricity denoted by "e," the argument of perigee denoted by "ω," and the Eccentric Anomaly of the satellite within the transfer orbit denoted by "E." The argument of perigee, "co," is a function of "τ," and the Eccentric Anomaly, "E," is a function of both "τ" and "t." The remaining parameters, "a," "b," and "e," may either be constant, or may be a function of "τ." The oblate epicycloid may be expressed by positions in two dimensions ("x" and "y") as distances from the center of the earth, where "x" is in the direction of the satellite within the initial orbit at an initial reference time, and "y" is in a direction 90° counterclockwise from "x" in the plane of the initial orbit. In this example, "x" may be in the direction of the orbital radius 110 ($R_t$) shown above in connection with FIG. 1 at an initial reference time. The values of "x" and "y" are represented by Equations 1 and 2 below. An oblate epicycloid segment is created when these two equations are evaluated for all possible values of τ at a given time, t, where t is equal to or greater than the lowest possible value for τ:

$$x(t,\tau) = a\cos(\omega)(\cos(E)-e) - b\sin(\omega)\sin(E) \quad (1)$$

$$y(t,\tau) = a\sin(\omega)(\cos(E)-e) + b\cos(\omega)\sin(E) \quad (2)$$

In the illustrated example of FIG. 2, the parameters "a," "b," and "e" are constant and "ω" and "E" are represented by Equations 3 and 4, respectively. The argument of perigee of the transfer orbit, "ω," is a function of parameters including but not limited to the initial condition of the true anomaly of the satellite within the initial orbit denoted by "$v_{p0}$," the gravitational parameter of the central body denoted by "μ," the semi-major axis of the initial orbit denoted by "$a_p$," and the parameter "τ" as described above. The Eccentric Anomaly is related to the Mean Anomaly by Equation 4, which must be solved iteratively for "E." The Mean Anomaly of the satellite within the transfer orbit is denoted by "M" and is a function of parameters including but not limited to "a," "μ," "t," and "τ," which have all been described above. The parameter "M" is represented by Equation 5.

$$\omega = v_{p0} + \sqrt{\frac{\mu}{a_p}}\,\tau \quad (3)$$

$$M = E - e\sin(E) \quad (4)$$

$$M = \sqrt{\frac{\mu}{a}}\,(t-\tau) \quad (5)$$

The oblate epicycloid 302 of the illustrated example intersects the boundary 222 and the boundary trajectory paths 214, 218 defining end points 304 and 306, which define a segment (e.g., an isotemporal line at a time, a constrained oblate epicycloid, etc.) 308 at a time, $t_1$, and denoted by "I($t_1$)." The segment 308 may define (e.g., define boundaries of) or bound a surface or a volume used to define or generate a search pattern and/or search parameters to determine a position of the satellite 203. In some examples, the segment 308 is used to narrow a search field (e.g., a search area and/or volume) used by sensors (e.g., detection and tracking systems) to search for the satellite 203 as a function of time. In particular, the segment 308 defined by the oblate epicycloid 302 may be used to establish a constrained oblate epicycloid search region ("COESR"), which may be further used to define search elements for tasking (e.g., guiding, steering, etc.) sensors to seek the location of the satellite 203, search parameters for seeking the location of the satellite 203 (e.g., search fences, search zone, etc.) and/or filtering sensor data to isolate relevant satellite observation data.

In some examples, the geometry (e.g., contour, shape, location, etc.) of the segment 308 is defined or calculated based on satellite data that may include one or more parameters. The parameters may include, but are not limited to, a satellite velocity, a satellite position, a last known orbit, an expected size and shape of a final (e.g., target) orbit such as a semi-major axis, Right Ascension of Ascending Node (RAAN), an argument of perigee, an eccentricity, a mean motion and/or inclination, a range of possible maneuver times based on last successful collect and/or a first missed collect, an expected maneuver time with uncertainty, a probability distribution function (PDF) of likely maneuver times (e.g., most likely maneuver times), a covariance matrix of the satellite positions, and/or a parking orbit two line element set (TLE), etc. Additionally or alternatively, the geometry of the segment 308 is adjusted based on input parameters including velocity changing maneuvers (e.g. inclination changes, translational delta-Vs, semi-major axis changes), and/or orbital uncertainties.

Additionally or alternatively, any of the above-mentioned factors may be used to calculate or determine the boundary trajectory paths 214, 218, the oblate epicycloid 302, and/or the end points 304, 306. In some examples, it is assumed that a single maneuver will be performed to place the satellite 203 into a transfer orbit from an initial orbit en-route to the transfer orbit and/or a single maneuver is used to perform a transition from the transfer orbit to a final orbit. In some examples, it is assumed that the velocity changing maneuvers are divided between inclination changing maneuvers and semi-major axis changing maneuvers.

In some examples, a probability distribution function (PDF) of a position of the satellite 203 may be determined to search for the satellite 203 and/or generate search parameters for locating the position of the satellite 203. In some examples, the PDF is defined in relation to a calculated segment (e.g., a PDF defined over an isotemporal line, surface or volume).

The examples disclosed herein enable use of less computational resources for locating the satellite 203 by bounding (e.g., narrowing) the segment 308 from the oblate epicycloid 302. In this example, the segment 308 and/or geometry of the segment 308 is calculated after determining the end points 304, 306, thereby bounding and/or limiting the area or volume defined by the segment 308 to be calculated. Computation of a shape of a constrained oblate epicycloid (e.g., a segment of an oblate epicycloid) is significantly less computationally intensive than calculating the entire geometry or a majority of the geometry of the oblate epicycloid or attempting to calculate each possible orbital path for the transfer orbit, and, thus reduces utilization of computational resources.

While the oblate epicycloid 302 is shown in this example, any other mathematical relationship, equations, geometric shapes, etc. may be used to estimate satellite orbital pathways. The relationships described above demonstrate an example in which the oblate epicycloid may be implemented to narrow the search field. Some examples may use matrices to characterize changes of the behavior of the oblate epicycloid over time (e.g., the oblate epicycloid as a function of time). Alternatively, the entire oblate epicycloid may be calculated as a function of time, and one or more segments may be defined or calculated later in relation to the entire oblate epicycloid. In particular, the entire oblate epicycloid may be calculated and one or more segments may be subdivided from the entire oblate epicycloid.

While the example of FIG. 3 describes the satellite 203 moving from the lower initial orbit 202 to the higher final orbit 204, the examples disclosed herein may be applied to continue a search for the satellite 203 if it does not complete the transition to final orbit 204 (e.g., the satellite 203 does not perform a final maneuver and, thus, orbits along the transfer orbit) and to the satellite 203 moving from the higher orbit 204 to the lower orbit 202. For example, there may be uncertainty as to when the satellite 203 moved from the orbit 204 that is shown by a path between the third point 216 and the fourth point 220, which defines a second boundary 310. In particular, the satellite 203 may reach the final orbit 204 at a point between the third and fourth points 216, 220 via a first transfer orbit, but not execute a final maneuver to maintain the final orbit 204, thereby causing the satellite 203 to continue along another portion of the transfer orbit defining the second boundary 310, which results from an uncertainty of when the satellite 203 departed from the final orbit 204 between the points 216, 220.

Figure 4:
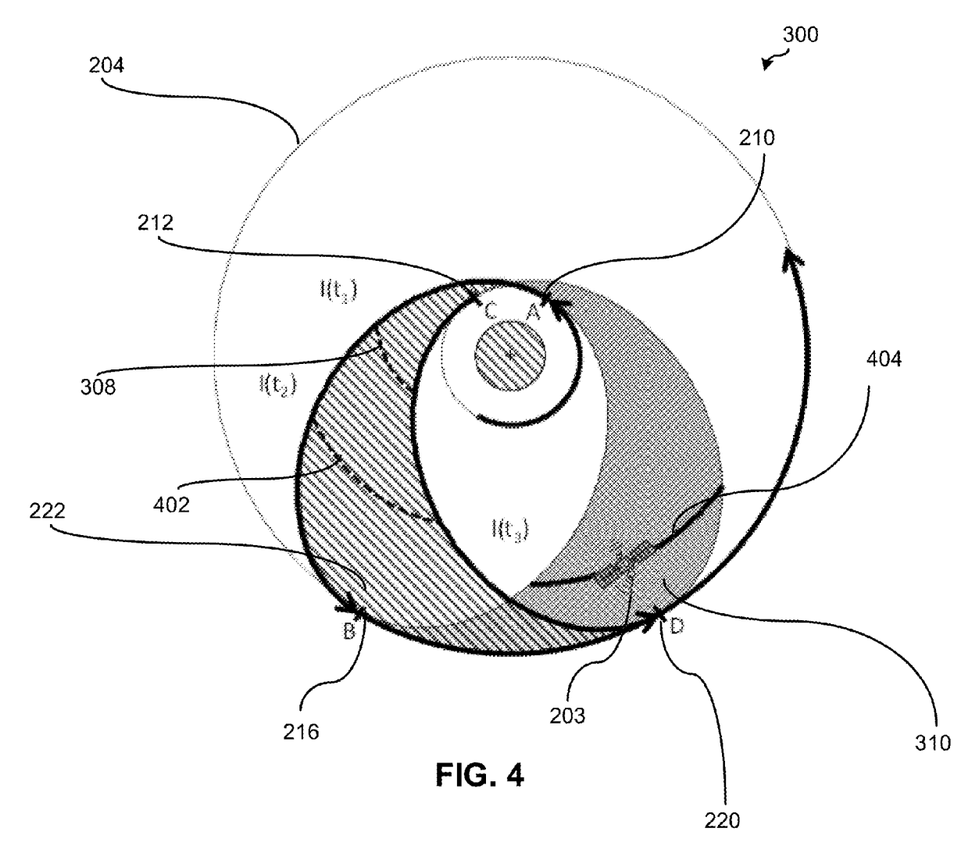
FIG. 4 illustrates example shapes and positions of multiple isotemporal lines of the example orbital pathway diagram of FIG. 3 representing the possible satellite locations at different example times.

FIG. 4 illustrates relative example shapes and positions of multiple isotemporal lines of the example orbital pathway diagram 300 of FIG. 3 representing the possible satellite locations at different example times. In this example, the satellite 203 reached the final orbit 204 at some point between the points 216, 220, but did not execute a final maneuver to maintain the final orbit 204 after reaching the point 216 and, thus, the uncertainty of the transfer orbit of the satellite 203 is defined by the boundary 222 and the boundary 310 described above in connection with FIGS. 2 and 3, respectively. In addition, the isotemporal segment (e.g., line) 308 described above in connection with FIG. 3, a second isotemporal segment (e.g., line) 402 denoted by "I($t_2$)" and a third isotemporal segment (e.g., line) 404 denoted by "I($t_3$)" corresponding to a time, $t_3$, of a second portion of the transfer orbit path are shown in the illustrated example.

In some examples, a search volume may be defined by two or more isotemporal line(s) and/or surface(s) to determine a position of the satellite 203. For example, if in addition to an uncertainty in the time of maneuver there was also uncertainty in using the maneuver to change the satellite's orbital plane, then additional oblate epicycloid segments may be calculated for the boundary of possible orbital planes of the transfer orbit. In particular, at times, $t_1$ or $t_2$, an isotemporal volume may be created using the segment 308 at time, $t_1$, or the segment 402 at time, $t_2$, and additional oblate epicycloid segments created in a different orbital plane. A probability distribution function (PDF) of a location of the satellite 203 may also be calculated in relation to the determined search volume.

In some examples, instead of a search volume, a search surface (e.g., a three-dimensional contour, a contoured plane, etc.) based on an isotemporal surface bounded by one or more oblate epicycloid segments may be used to search for the satellite 203. The search surface may change its geometry as a function of time, for example. In some examples, a surface may be defined as a function of time.

Figure 5:
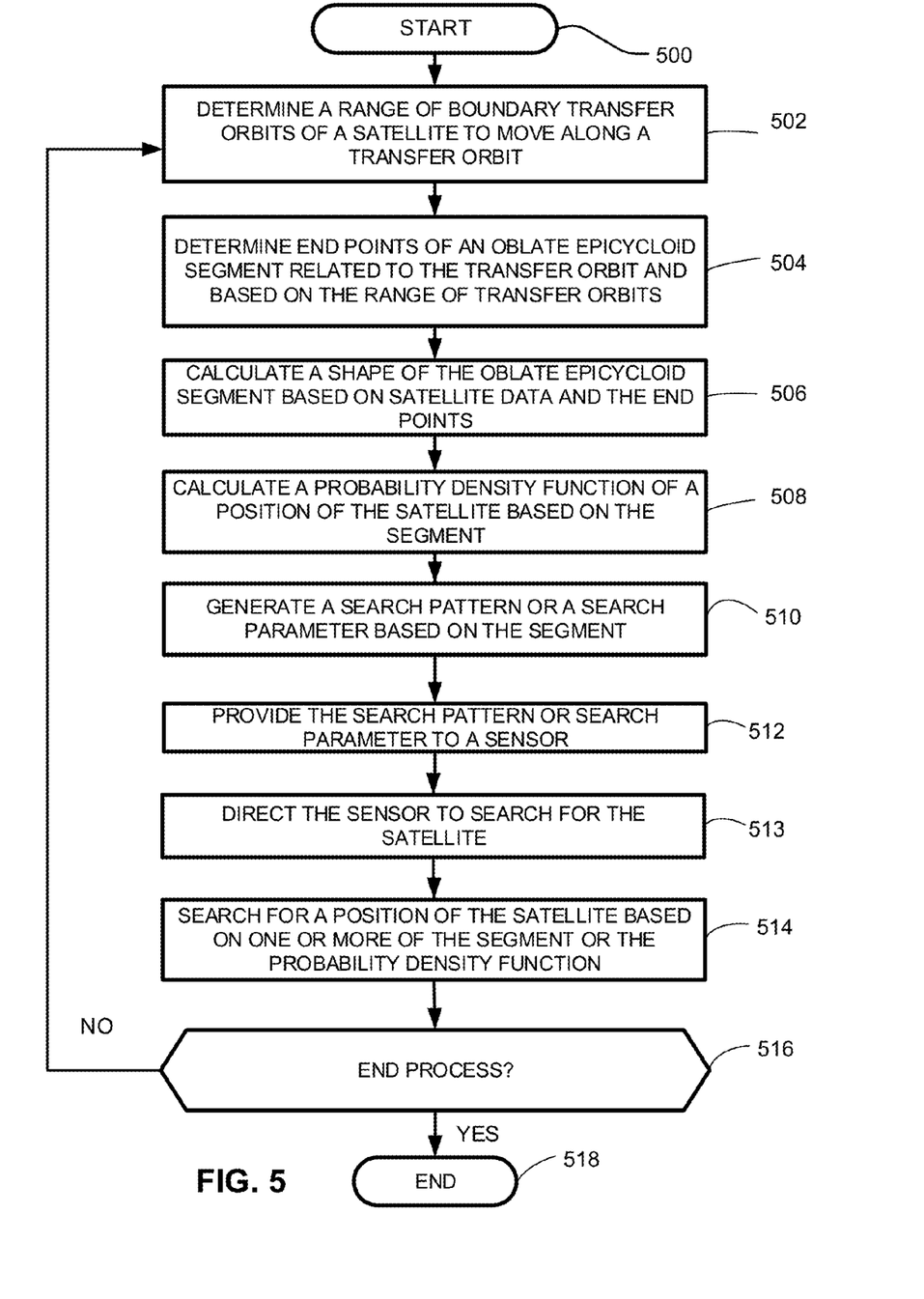
FIG. 5 is a flowchart representative of an example method that may be used to implement the examples disclosed herein.

A flowchart representative of an example method for implementing the examples disclosed herein is shown in FIG. 5. In this example, the method may be implemented using machine readable instructions that comprise a program for execution by a processor such as the processor 612 shown in the example processor platform 600 discussed below in connection with FIG. 6. The program may be embodied in software stored on a tangible computer readable storage medium such as a CD-ROM, a floppy disk, a hard drive, a digital versatile disk (DVD), a Blu-ray disc, or a memory associated with the processor 612, but the entire program and/or parts thereof could alternatively be executed by a device other than the processor 612 and/or embodied in firmware or dedicated hardware. Further, although the example program is described with reference to the flowchart illustrated in FIG. 5, many other methods of implementing the example disclosed herein may alternatively be used. For example, the order of execution of the blocks may be changed, and/or some of the blocks described may be changed, eliminated, or combined.

As mentioned above, the example method of FIG. 5 may be implemented using coded instructions (e.g., computer and/or machine readable instructions) stored on a tangible computer readable storage medium such as a hard disk drive, a flash memory, a read-only memory (ROM), a compact disc (CD), a digital versatile disc (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example process of FIG. 5 may be implemented using coded instructions (e.g., computer and/or machine readable instructions) stored on a non-transitory computer and/or machine readable medium such as a hard disk drive, a flash memory, a read-only memory, a compact disc, a digital versatile disc, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

The example method of FIG. 5 begins at block 500 where a satellite (e.g., the satellite 203) or RSO has begun an initial maneuver to transition from an initial orbit to a final orbit via a transfer orbit (block 500). While the example method of FIG. 5 is related to the satellite transitioning to the final orbit, the example method of FIG. 5 or portions of the example method of FIG. 5 may be implemented prior to the satellite leaving the initial orbit. Next, a range of boundary transfer orbits (e.g., the boundary transfer orbits 214, 218) of the satellite are determined (block 502). Such a determination may be made by defining first and second exit points corresponding to a range of when the satellite may depart or may have departed the initial orbit, for example. In particular, the range may be defined by the points 210, 212 described above in connection with FIG. 2. In some examples, the range of boundary transfer orbits may define a surface and/or a volume defined by the boundary transfer orbits. Next, end points (e.g., the end points 304, 306) of an oblate epicycloid (e.g., the oblate epicycloid 302) related to the transfer orbit are determined and/or defined (block 504).

This determination may be based on time or determined at a specified time. The oblate epicycloid of the illustrated example is defined by Equations 1-5 described above in connection with FIG. 3 and the geometry of the oblate epicycloid varies with time. In some other examples, an epicycloid or any other relevant geometric form, function or shape may be used.

A segment of the oblate epicycloid is calculated, using a processor, based on satellite data and the end points (block 506). The shape and/or geometry of the segment may be calculated based on factors (e.g., variables) including, but not limited to, a satellite velocity, a satellite position, a last known orbit, an expected size and shape of a final (e.g., target) orbit such as a semi-major axis, Right Ascension of Ascending Node (RAAN), an argument of perigee, an eccentricity, a mean motion and/or inclination, a range of possible maneuver times based on last successful collect and/or a first missed collect, an expected maneuver time with uncertainty, a probability distribution function (PDF) of likely maneuver times (e.g., most likely maneuver times), a covariance matrix of the satellite positions, and/or a parking orbit two line element set (TLE), etc. The segment of the oblate epicycloid is used to define a search zone (e.g., constrained oblate epicycloid search region or COESR, search field, etc.). The segment of the illustrated example may be used to establish search elements sets for tasking a sensor (e.g., a detection and tracking system), search parameters (e.g., search fences, etc.) for tasking the sensor and/or filters for searching or processing sensor data to isolate satellite data (e.g., satellite positions, etc.). In some examples, the segment geometry is calculated and/or determined as a function of time. In particular, the shape and position of the segment based on time may be calculated and/or determined. In other examples, the shape and/or position of the segment geometry is determined at a specific time.

In some examples, a probability distribution function of a position of the satellite is calculated in relation to and/or based on the segment (block 508). In some examples, the probability distribution function is based on time or calculated at a specified time. Additionally or alternatively, the probability distribution function is further used to establish, determine, and/or modify the search zone. In some examples, a search parameter and/or a search pattern is created or generated based on the segment (block 510). The search parameter may be instructions and/or the search zone provided (e.g., communicated) to a sensor (e.g., a detection sensor, an object detection and tracking system, etc.) to begin searching at a defined location, for example (block 512). The sensor is then directed and/or instructed to search for the satellite (block 513). For example, in response to receiving instructions, the sensor searches for the satellite based on one or more of the segment or the probability distribution function (block 514). In this example, the sensor detects and tracks the satellite. In other examples, the sensor detects the position of a satellite at a specific time. The sensor may be staring, scanning, optical, radar, and/or infrared, etc. In some examples, the processor directs or instructs the sensor (e.g., sends instructions to the sensor) based on the search pattern, the search zone and/or the search parameter.

In some examples, the search parameter, the search pattern and/or the search zone may be used to coordinate numerous sensors to begin searching for a position of the satellite. Additionally or alternatively, the search parameter may be a function of time and search instructions for sensor(s) may be based on time. In other examples, the search parameter, the search pattern and/or the search zone may be used to filter sensor data to enable processing of relevant sensor observations to greatly reduce the amount of data to be processed by searching through the sensor data. If the process is determined to end (block 516), the process ends (block 518). The process may end based on determining the location of the satellite, completing the determination of the search parameter, the search pattern and/or the search zone, and/or transmission of the search instructions. If the process is determined not to end (block 516), the process repeats (block 502). For example, if the satellite is not found, the completed searches can be fed back to the algorithm to determine new search parameters.

Figure 6:
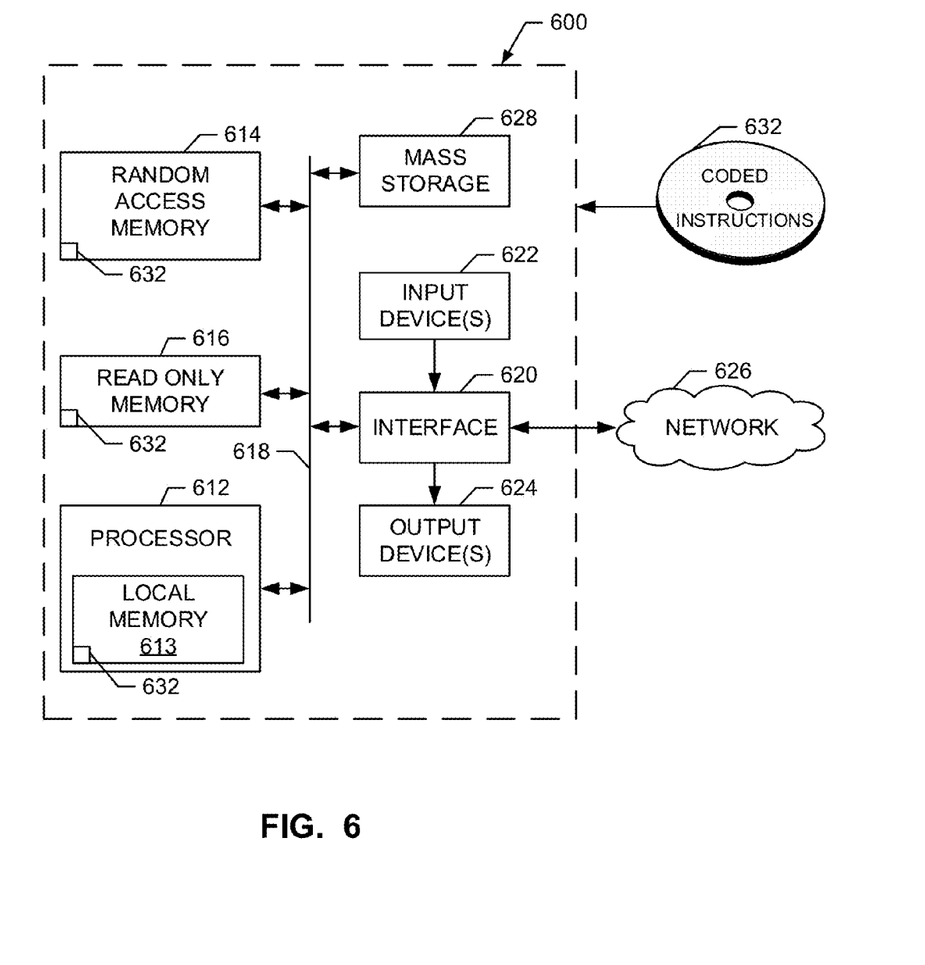
FIG. 6 is a block diagram of an example processor platform capable of executing machine readable instructions to implement the example method of FIG. 5.

FIG. 6 is a block diagram of an example processor platform 600 capable of executing instructions to implement the method of FIG. 5. The processor platform 600 can be, for example, a server, a personal computer, a mobile device (e.g., a tablet such as an iPad™), a personal digital assistant (PDA), an Internet appliance, or any other type of computing device.

The processor platform 600 of the illustrated example includes a processor 612. The processor 612 of the illustrated example is hardware. For example, the processor 612 can be implemented by one or more integrated circuits, logic circuits, microprocessors or controllers from any desired family or manufacturer.

The processor 612 of the illustrated example includes a local memory 613 (e.g., a cache). The processor 612 of the illustrated example is in communication with a main memory including a volatile memory 614 and a non-volatile memory 616 via a bus 618. The volatile memory 614 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 616 may be implemented by flash memory and/or any other desired type of memory device. Access to the main memory including the volatile memory 614 and the non-volatile memory 616 is controlled by a memory controller.

The processor platform 600 of the illustrated example also includes an interface circuit 620. The interface circuit 620 may be implemented by any type of interface standard, such as an Ethernet interface, a universal serial bus (USB), and/or a PCI express interface.

In the illustrated example, one or more input devices 622 are connected to the interface circuit 620. The input device (s) 622 permit(s) a user to enter data and commands into the processor 612. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 624 are also connected to the interface circuit 620 of the illustrated example. The output devices 624 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 620 of the illustrated example, thus, typically includes a graphics driver card, a graphics driver chip or a graphics driver processor.

The interface circuit 620 of the illustrated example also includes a communication device such as a transmitter, a receiver, a transceiver, a modem and/or network interface card to facilitate exchange of data with external machines (e.g., computing devices of any kind) via a network 626 (e.g., an Ethernet connection, a coaxial cable, a cellular telephone system, etc.).

The processor platform 600 of the illustrated example also includes one or more mass storage devices 628 for storing software and/or data. Examples of such mass storage devices 628 include floppy disk drives, hard drive disks, compact disk drives, Blu-ray disc drives, RAID systems, and digital versatile disc (DVD) drives.

Coded instructions 632 to implement the method of FIG. 5 may be stored in the mass storage device 628, in the volatile memory 614, in the non-volatile memory 616, and/or on a removable tangible computer readable storage medium such as a CD or DVD.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent. While satellites are described, the example apparatus may be applied to vehicles, aerodynamic structures, etc.

What is claimed is:

1. A method comprising:
   determining, based on boundary transfer orbits of a satellite, end points of an oblate epicycloid segment related to a transfer orbit of the satellite;
   calculating, using a processor, a shape of the oblate epicycloid segment based on satellite data and the end points to define a search zone to determine a position of the satellite as the satellite moves along the transfer orbit; and
   directing a sensor to search for the satellite based on the search zone.

2. The method as defined in claim 1, further comprising generating, using the processor, a search parameter based on the oblate epicycloid segment to seek the position of the satellite.

3. The method as defined in claim 2, wherein the search parameter comprises a search fence, search region or search zone.

4. The method as defined in claim 1, further comprising calculating a probability distribution function of a position of the satellite in relation to the oblate epicycloid segment.

5. The method as defined in claim 1, wherein the oblate epicycloid segment is calculated as a function of time.

6. The method as defined in claim 1, wherein the end points are determined as a function of time.

7. The method as defined in claim 1, wherein the satellite data comprises one or more of a velocity of the satellite, a position of the satellite, a last known orbit of the satellite, a parking orbit two line element set, an expected size and shape of a target orbit, a range of possible maneuver times, a probability distribution function of likely maneuver times, or a covariance matrix.

8. The method as defined in claim 1, wherein the oblate epicycloid segment defines boundaries of an isotemporal line, surface or volume.

9. A method comprising:
   determining a range of boundary transfer orbits of a satellite; and
   determining end points of one or more oblate epicycloid segments related to a transfer orbit of the satellite at a specified time based on the range of boundary transfer orbits;
   calculating, using a processor, the one or more oblate epicycloid segments based on the end points, wherein the one or more oblate epicycloid segments define an isotemporal line, surface or volume to define a search zone for the satellite at the specified time; and
   directing a sensor to search for a position of the satellite based on the search zone as the satellite moves along the transfer orbit.

10. The method as defined in claim 9, further comprising calculating a probability distribution function of the position of the satellite, and wherein directing the sensor to search for the position of the satellite is further based on the probability distribution function.

11. The method as defined in claim 9, wherein directing the sensor to search for the position of the satellite comprises generation of a search pattern.

12. The method as defined in claim 9, wherein the satellite data comprises one or more of a velocity of the satellite, a position of the satellite, a last known orbit of the satellite, a parking orbit two line element set, an expected size and shape of a target orbit, a range of possible maneuver times, a probability distribution function of likely maneuver times, or a covariance matrix.

13. A tangible machine readable medium having instructions stored thereon, which when executed, cause a processor to:
   determine end points of an oblate epicycloid segment related to a transfer orbit of a satellite;
   calculate a segment of the oblate epicycloid based on satellite data and the end points, the segment to be used in searching for a position of the satellite as the satellite moves along the transfer orbit; and
   direct a sensor to search for the satellite based on the segment of the oblate epicycloid.

14. The tangible machine readable medium having instructions stored thereon as defined in claim 13, which when executed, further cause a processor to calculate a probability distribution function of the position of the satellite as the satellite moves along the transfer orbit.

15. The tangible machine readable medium having instructions stored thereon as defined in claim 13, which when executed, further cause a processor to provide the segment or a search zone to the sensor based on the segment to a detection sensor to be used in searching for the position of the satellite as the satellite moves along the transfer orbit.

16. The tangible machine readable medium having instructions stored thereon as defined in claim 13, wherein the satellite data comprises one or more of a velocity of the satellite, a position of the satellite, a last known orbit of the satellite, a parking orbit two line element set, an expected size and shape of a target orbit, a range of possible maneuver times, a probability distribution function of likely maneuver times, or a covariance matrix.

17. The tangible machine readable medium having instructions stored thereon as defined in claim 13, wherein the segment is calculated by determining the oblate epicycloid and subdividing the oblate epicycloid based on the end points.

* * * * *